US012571329B2

(12) United States Patent
Bitter et al.

(10) Patent No.: US 12,571,329 B2
(45) Date of Patent: Mar. 10, 2026

(54) ALTERING STRUCTURAL RESPONSE OF TWO-PIECE HOLLOW-VANE ASSEMBLY

(71) Applicant: RTX Corporation, Farmington, CT (US)

(72) Inventors: David E. Bitter, Chester, CT (US); William John Oldach, West Hartford, CT (US); William C. Sheridan, East Haddam, CT (US); Matthew Michael Massaro, Wilmington, DE (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/761,607

(22) Filed: Jul. 2, 2024

(65) Prior Publication Data

US 2024/0352871 A1 Oct. 24, 2024

Related U.S. Application Data

(63) Continuation-in-part of application No. 18/121,049, filed on Mar. 14, 2023, now abandoned.

(51) Int. Cl.
*F01D 25/06* (2006.01)
*F01D 9/04* (2006.01)

(52) U.S. Cl.
CPC ............. *F01D 25/06* (2013.01); *F01D 9/041* (2013.01); *F05D 2220/323* (2013.01); *F05D 2230/60* (2013.01); *F05D 2240/12* (2013.01); *F05D 2260/96* (2013.01)

(58) Field of Classification Search
CPC . F01D 5/18; F01D 25/06; F01D 9/041; F01D 5/16; F01D 9/065; F01D 17/162; F01D 5/147; F05D 2230/237; F05D 2260/96; F05D 2220/323; F05D 2230/60; F05D 2240/12; F05D 2230/211; F05D 2230/54; F05D 2300/437; F05D 2300/505; B23K 1/0018; B23P 15/04
See application file for complete search history.

(56) References Cited

U.S. PATENT DOCUMENTS 5,725,355 A * 3/1998 Crall ........................ F01D 5/147 416/229 A
9,957,972 B2 5/2018 Foster
10,823,190 B2 * 11/2020 Weisse .................... B32B 37/18
11,148,221 B2 * 10/2021 Bales ...................... F01D 5/147
11,867,084 B1 * 1/2024 Pickens ................... F01D 9/044
2014/0241897 A1 * 8/2014 Bales .................. B23K 1/0018 228/256
2015/0132142 A1 5/2015 Weisse
(Continued)

FOREIGN PATENT DOCUMENTS

EP 4431700 A 8/2024

OTHER PUBLICATIONS

Extended European Search Report for counterpart EP Application No. 24162674 mailed Apr. 29, 2024.
(Continued)

*Primary Examiner* — Aaron R Eastman
(74) *Attorney, Agent, or Firm* — Bachman & LaPointe, P.C.

(57) ABSTRACT

A hollow vane assembly including an open body including an interior; a cover brazed to the open body to form at least one flow passage; and at least one surface feature on an interior surface of the cover.

13 Claims, 4 Drawing Sheets

(56) References Cited

U.S. PATENT DOCUMENTS

| | | | | |
|---|---|---|---|---|
| 2017/0159442 | A1* | 6/2017 | Velazquez, Jr. | F01D 5/288 |
| 2017/0370375 | A1* | 12/2017 | Quinn | F01D 5/147 |
| 2018/0291746 | A1* | 10/2018 | Vargas | B23K 20/1295 |
| 2019/0017386 | A1* | 1/2019 | Malmborg | F04D 29/388 |
| 2019/0040744 | A1* | 2/2019 | Bales | F04D 29/26 |
| 2019/0112931 | A1* | 4/2019 | Malmborg | F04D 29/668 |
| 2019/0186293 | A1 | 6/2019 | Boutaleb et al. | |
| 2019/0218915 | A1* | 7/2019 | Bales | F01D 5/18 |
| 2019/0218951 | A1 | 7/2019 | Bales et al. | |
| 2020/0165920 | A1* | 5/2020 | Sasao | F01D 5/18 |
| 2020/0182086 | A1 | 6/2020 | Marquie et al. | |
| 2020/0215642 | A1* | 7/2020 | Malmborg | F01D 5/18 |
| 2020/0224537 | A1 | 7/2020 | Bales et al. | |
| 2020/0291815 | A1* | 9/2020 | Malmborg | F01D 25/06 |
| 2020/0298352 | A1* | 9/2020 | Malmborg | B23P 15/04 |
| 2020/0300093 | A1* | 9/2020 | Drescher | B22F 10/20 |
| 2020/0355080 | A1* | 11/2020 | Bales | F01D 5/147 |
| 2020/0368805 | A1* | 11/2020 | Bales | F04D 29/324 |
| 2021/0032997 | A1* | 2/2021 | Bales | B23P 15/04 |
| 2021/0060692 | A1* | 3/2021 | Bales | B23K 20/023 |
| 2021/0146462 | A1* | 5/2021 | Lopshire | F01D 5/147 |
| 2021/0317753 | A1 | 10/2021 | Reba | |

OTHER PUBLICATIONS

Extended European Search Report for counterpart EP Application No. 25186127.4 dated Nov. 11, 2025.

* cited by examiner

ALTERING STRUCTURAL RESPONSE OF TWO-PIECE HOLLOW-VANE ASSEMBLY

CROSS REFERENCE TO RELATED APPLICATION AND CLAIM OF PRIORITY

This application claims priority to U.S. application Ser. No. 18/121,049 filed Mar. 14, 2023.

BACKGROUND

The present disclosure is directed to a hollow vane with an open body and a cover with interior surface features to modify the vibratory characteristics of the vane.

Hollow vanes are typically utilized to enable air, either hot or cold, to flow through the part to achieve a desired thermal effect. Historically, hollow vanes have been manufactured by casting the external airfoil shape with cores located internally within the mold. This method results in a hollow cavity within the cast part, however, castings, from both a process capability and supplier willingness perspectives, are not capable of meeting the dimensional and material requirements as demanded by the engine operating environment.

What is needed is a vane cover that can be modified to adapt the vibratory characteristics of the vane for a predetermined operating service.

SUMMARY

In accordance with the present disclosure, there is provided a process of tailoring vibratory characteristics of a cover for an open body hollow vane assembly comprising forming the open body, the open body including an interior; forming a cover, the cover being configured to attach to the open body to form at least one flow passage; forming at least one surface feature on an interior surface of the cover, the surface feature configured to be proximate the interior; and brazing the cover to the open body.

A further embodiment of any of the foregoing embodiments may additionally and/or alternatively include the process further comprising forming the at least one surface feature integral with the interior surface of the cover.

A further embodiment of any of the foregoing embodiments may additionally and/or alternatively include the at least one surface feature is selected from the group consisting of a groove, a rib, a channel, a trench, a furrow, a dimple, a nub, a post, an iso-grid and the like.

A further embodiment of any of the foregoing embodiments may additionally and/or alternatively include the process further comprising forming an airfoil from the combination of the open body brazed together with the cover.

A further embodiment of any of the foregoing embodiments may additionally and/or alternatively include the process further comprising forming a single walled structure having contoured surfaces including the at least one surface feature formed by additive and/or subtractive processes.

A further embodiment of any of the foregoing embodiments may additionally and/or alternatively include the process further comprising modifying a vibratory characteristic of the cover with the at least one surface feature.

A further embodiment of any of the foregoing embodiments may additionally and/or alternatively include the process further comprising changing a modal shape of the cover to enhance the stiffness of the cover locally responsive to aerodynamic forces created by a working fluid flowing over the hollow vane assembly.

In accordance with the present disclosure, there is provided A hollow vane assembly comprising an open body including an interior; a cover brazed to the open body to form at least one flow passage; and at least one surface feature on an interior surface of the cover.

A further embodiment of any of the foregoing embodiments may additionally and/or alternatively include the at least one surface feature is selected from the group consisting of a groove, a rib, a channel, a trench, a furrow, a dimple, a nub, a post, an iso-grid and the like.

A further embodiment of any of the foregoing embodiments may additionally and/or alternatively include the surface feature includes material attached to the interior surface of the cover.

A further embodiment of any of the foregoing embodiments may additionally and/or alternatively include a single walled structure having contoured surfaces and a surface feature is formed proximate the interior of the open body brazed together with the cover.

A further embodiment of any of the foregoing embodiments may additionally and/or alternatively include the at least one surface feature is configured to modify a vibratory characteristic of the cover.

A further embodiment of any of the foregoing embodiments may additionally and/or alternatively include the at least one surface feature includes a raised structure that protrudes from the interior surface of the cover.

A further embodiment of any of the foregoing embodiments may additionally and/or alternatively include the surface feature is formed by removing material from the interior surface of the cover.

In accordance with the present disclosure, there is provided a process for modifying a vibratory characteristic of a cover to an open body comprising forming an open body, the open body includes a leading edge opposite a trailing edge, the open body includes a pressure side and suction side opposite the pressure side, the open body including an interior; forming a cover, the cover being configured to couple with the open body proximate the pressure side to form at least one flow passage; forming at least one surface feature on an interior surface of the cover; and brazing the cover to the open body.

A further embodiment of any of the foregoing embodiments may additionally and/or alternatively include. the at least one surface feature is selected from the group consisting of a groove, a rib, a channel, a trench, a furrow, a dimple, a nub, a post, an iso-grid and the like.

A further embodiment of any of the foregoing embodiments may additionally and/or alternatively include the process further comprising modifying a vibratory characteristic of the cover with the at least one surface feature.

A further embodiment of any of the foregoing embodiments may additionally and/or alternatively include the process further comprising changing a modal shape of the cover to enhance the stiffness of the cover locally responsive to aerodynamic forces created by a working fluid flowing over the hollow vane assembly.

A further embodiment of any of the foregoing embodiments may additionally and/or alternatively include the process further comprising forming a single walled structure having contoured surfaces including the at least one surface feature formed by additive and/or subtractive processes.

A further embodiment of any of the foregoing embodiments may additionally and/or alternatively include the process further comprising forming an airfoil from the combination of the open body brazed together with the cover having the at least one surface feature, the airfoil being responsive to the at least one surface feature.

A further embodiment of any of the foregoing embodiments may additionally and/or alternatively include the process further comprising adding mass at a predetermined location on the interior surface of the cover.

Other details of the hollow vane assembly are set forth in the following detailed description and the accompanying drawings wherein like reference numerals depict like elements.

DETAILED DESCRIPTION

Figure 1:
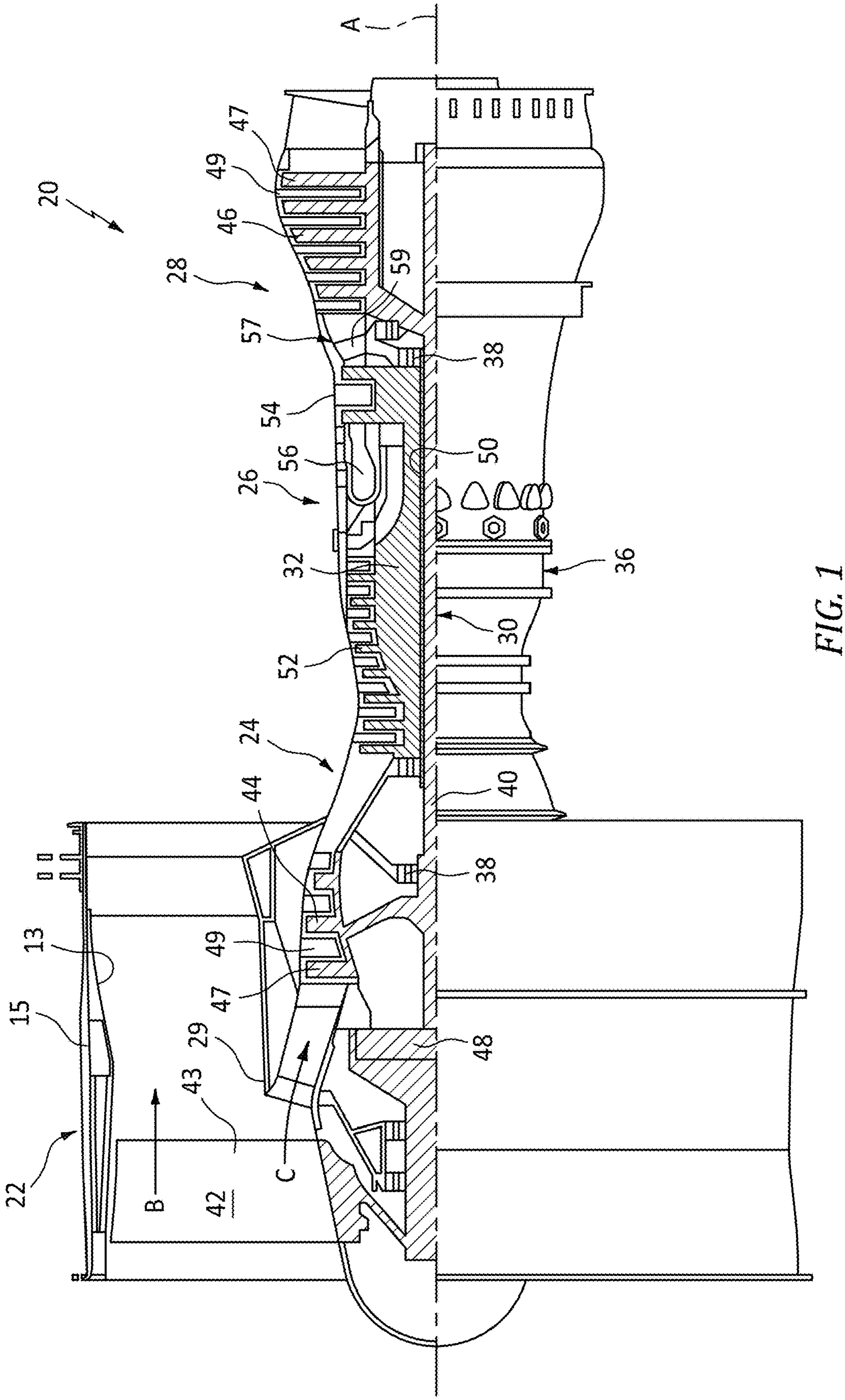
FIG. 1 is a cross section view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of pounds-mass per hour lbm/hr of fuel flow rate being burned divided by pounds-force lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "LOW corrected fan tip speed" is the actual fan tip speed in ft/sec divided by an industry standard temperature correction of $[(\text{Tram } °\text{R})/(518.7°\text{R})]^{0.5}$. The "low corrected fan tip speed" can be less than or equal to 1150.0 ft/second (350.5 meters/second), and greater than or equal to 1000.0 ft/second (304.8 meters/second).

Figure 2:
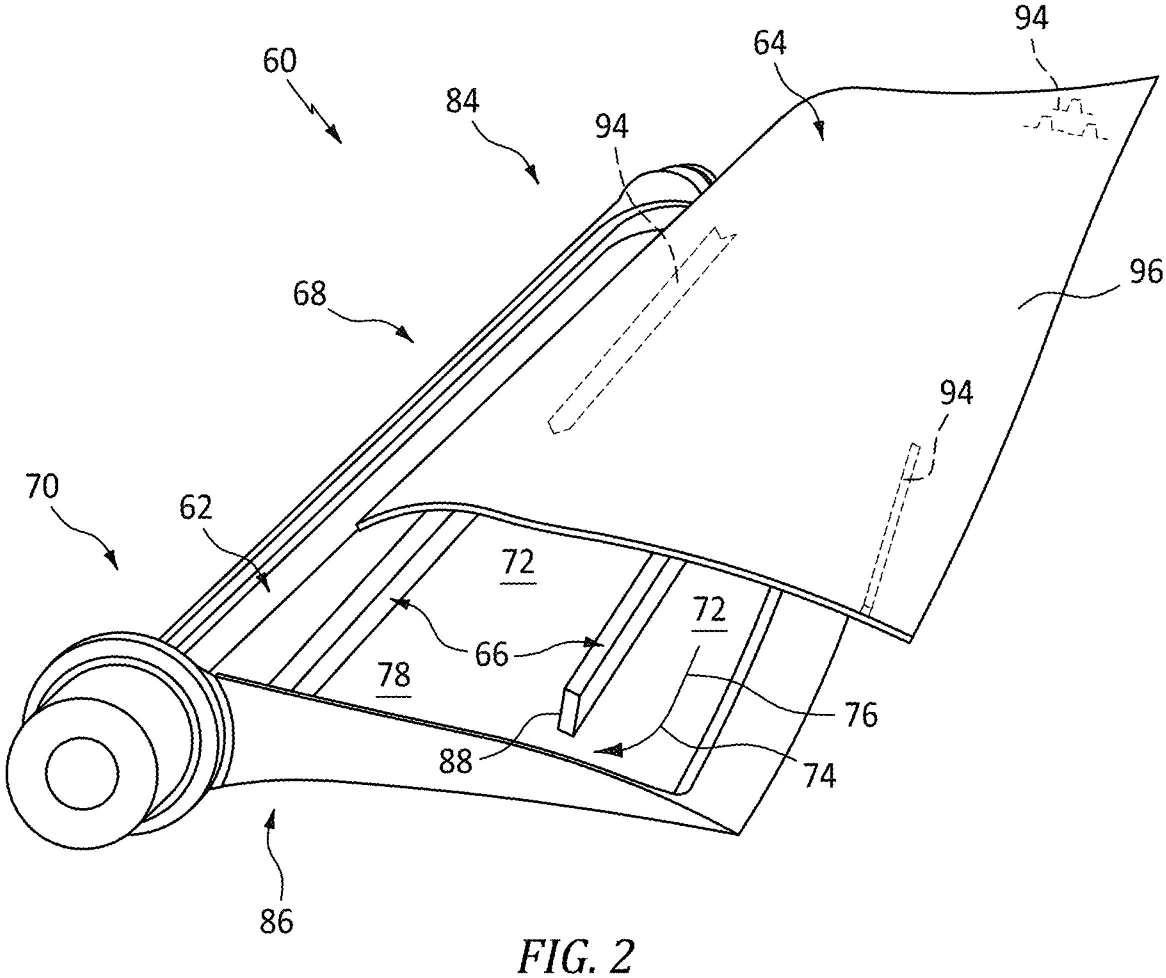
FIG. 2 is a schematic representation of an exemplary vane assembly.

Referring also to FIG. 2 shows an exemplary two piece hollow-vane assembly 60. The hollow-vane assembly 60 includes an open body 62 that can be a single piece design, being completely integral or monolithic. The two piece hollow-vane assembly 60 includes a cover 64 that is attachable to the open body 62. The open body 62 includes cover support structure(s) 66. The open body 62 and cover 64 are combined to form an airfoil 68 of a vane 70 when brazed together. The open body 62 and cover 64 are configured as a single wall structure 63 as opposed to a double wall structure vane configuration with two interior chambers divided by an interior wall and contained within an exterior wall structure. It is contemplated that the hollow-vane assembly 60 can also be configured having contoured surfaces, such as a turbine blade. The hollow-vane assembly 60 can include a three dimensionally contoured shape. The three dimensional contoured surface can refer to a surface defined by an X, Y, and Z axis. The three dimensional contoured surface can vary from point to point to include surface variation of X, Y and Z coordinates.

The vane assembly 60 is shown with representative fluid flow passages 72 with flow arrow 74. The flow arrow 74 shows an exemplary cooling/heating fluid 76 flow through the fluid flow passages 72 at the interior 78 formed by the open body 62 and cover 64. The flow passages 72 can be configured as multiple cooling channels 72 that allow for cooling fluid 76 to flow through the interior 78.

The open body 62 and cover 64 can be constructed from rigid materials, such as a metal alloy and in alternative embodiments, from heat resistant super alloy composition, nickel-based, or cobalt based compositions. The open body 62 and cover 64 can be made of the same material or different materials.

Figure 3:
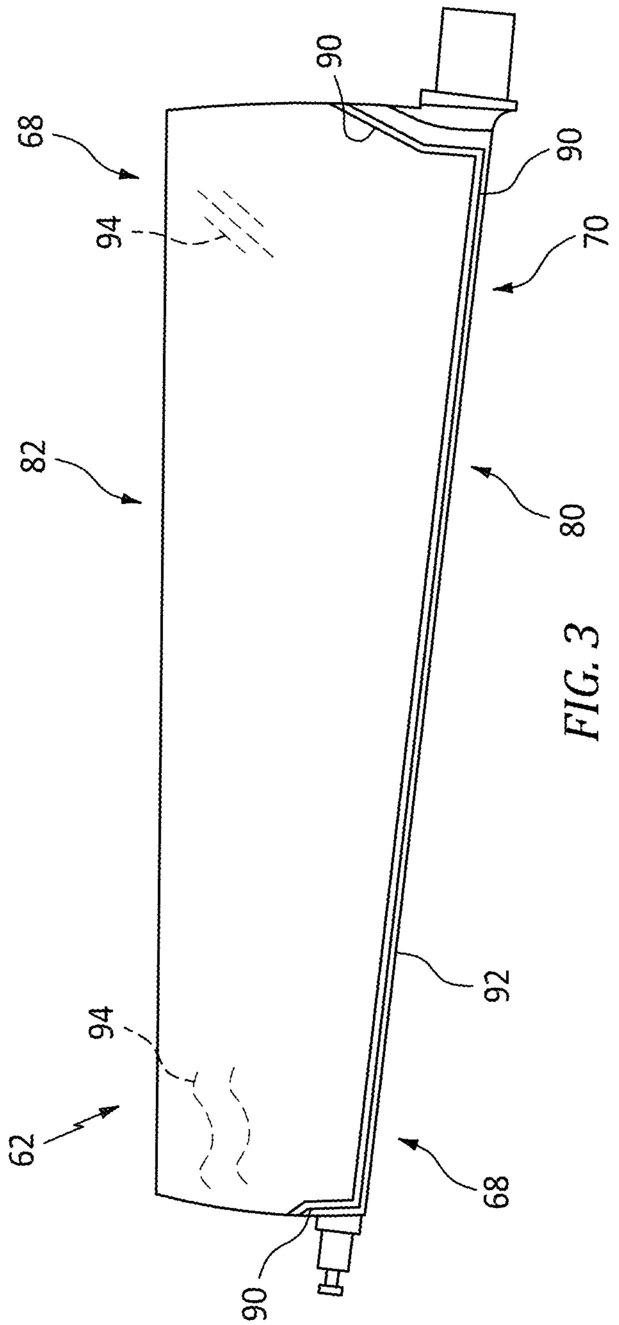
FIG. 3 is a schematic representation of an exemplary vane assembly.

Referring also to FIG. 3, vane assembly 60 is shown. The open body 62 can be formed from a casting, for example. The open body 62 can include a leading edge 80 opposite a trailing edge 82, a pressure side 86 and suction side 84 opposite the pressure side 86 (FIG. 2). The open body 62 including the cover support structures 66 allow for the formation of the flow passages 72. The cover support structure 66 can form an interior wall 88. The cover support structure 66 can be raised surface features of the open body 62. The cover support structure 66 can extend from the open body 62 distally.

The cover support structure 66 can form parts of the flow passages 72 along with the cover 64 and open body 62. The open body 62 with integral cover support structure(s) 66 can be manufactured via a manufacturing process that supports the geometric and material capability needs of the vane 60. Potential manufacturing options for the open body 62 can include casting, additive manufacturing, or conventional machining.

Once the open body 62 is manufactured all surfaces of the vane 60, including the now exposed interior 78 of the open body 62, can be post processed to achieve the desired metallurgical properties.

In parallel to the manufacturing of the open body 62, the cover 64 can be fabricated. In addition to the manufacturing options available for the open body 62 the cover 64 can be formed to the desired geometry via conventional metal forming methods like stamping, deep drawing, or hydroforming, and machining via multi-axis CNC.

The cover 64 can be attached to the open body 62 via brazing with structural brazing joints 90. The geometry of the structural brazing joints 90 is dictated by the location along the vane assembly 60. For example, shown in FIG. 3, the brazing joint 90 is located proximate the leading edge 80. The leading edge 80 can include a non-structural seam 92 that can be filled and polished flush for aero considerations.

The cover 64 can be formed from layers 93 as shown in FIG. 3. At least one surface feature 94 can be formed in the cover 64. The surface feature 94 can be formed in a variety of shapes and sizes and can include grooves, ribs, channel, trench, furrow, dimple, nub, post, iso-grid, or other feature integral with the interior surface 96 of the cover 64 proximate the interior 78. The surface feature 94 can be raised structures that protrude from the interior surface 96. The surface feature 94 can be material added/attached to the interior surface 96. The surface feature 94 can be formed by removing material from the interior surface 96 of the cover 64. The surface feature 94 can be formed by adding mass at a predetermined location on the cover 64. The surface feature 94 can be placed along a variety of paths across the interior surface 96 proximate the interior 78. The surface feature 94 can be formed by additive or subtractive processes. An exterior surface 98 of the cover 64 can remain smooth and polished for aero purposes.

The surface feature 94 can act as a stiffener to alter the structural response and redistribute the stress on the cover 64. Redistribution of the stress on the cover 64 can enhance the durability of the vane assembly 60 and prolong the life of the brazing joint 90.

The surface feature 94 is configured to modify the vibratory characteristics of the cover 64. The surface feature 94 is configured to change the modal shapes of the cover 64 to enhance the stiffness of the cover 64 locally responsive to aerodynamic forces created by the working fluid flowing over the vane assembly 60.

The surface feature 94 can provide the means to alter the airfoil 68 stiffness and tailor to the vibratory characteristics of the airfoil 68 in different applications. The capacity to tailor the vibratory characteristics can allow the same engine module or components to be modified and re-used in different applications. For example, taking an engine designed for certain cruise speeds and modifying the surface feature 94 for use at other cruise speeds or from a steady flight to a more variable flight pattern (cruise versus repeated take-off/land). Engines that spend significant time at cruise are subjected to longer term, consistent vibrations or constant levels of vibration. By comparison, engines experience higher spikes in vibration during take-off and landing. By tailoring the airfoil 68 to the intended purpose of the engine, one can optimize the airfoil 68 for these constant vibrations at cruise or frequent spikes during take-off/land. This will allow one to optimize part life based on material fatigue.

Similarly to the open body 62, post processing of all part surfaces may be performed on the cover 64 to achieve the desired metallurgical properties.

With both the open body 62 and cover 64 fabrication completed the cover 64 can be permanently joined to the open body 62 via brazing. Any subsequent heat treatment, final finishing, inspections, etc. can follow the brazing.

Figure 4:
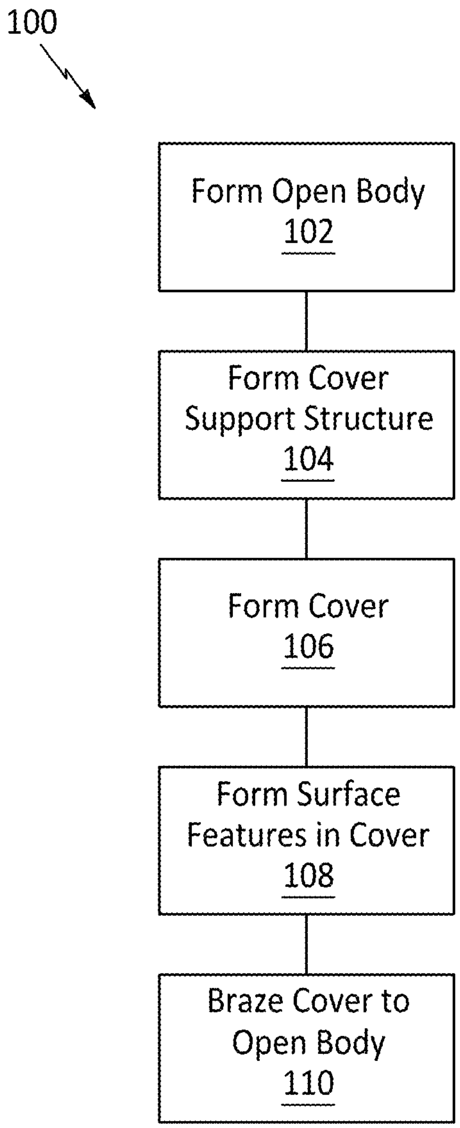
FIG. 4 is an exemplary process map.

Referring also to FIG. 4 a process map showing the process 100. The process 100 can include the step 102 of forming the open body 62. The next step 104 can include forming the cover support structure 66 in the open body 62. The next step 106 can include forming the cover 64. The next step 108 can include forming the surface feature 94 in the cover 64. The next step 110 can include brazing the cover 64 to the open body 62. The cover support structure 66 can be coupled to the cover 64 by brazing.

An example of forming the surface feature 94 can include machining a metal block into the cover 64 with ribs/fins. Another example can include machining the cover 64 with recesses/channels/grooves to change the stiffness. By forming/adding ribs, one can manipulate the modal response of the airfoil 68. The range of manipulation is dependent on the shaping of the ribs or channels, their locations, or quantities.

A technical advantage of the disclosed hollow vane assembly includes the selection of a manufacturing method that meets the geometric requirements of the hardware while reducing the metallurgical shortfalls imposed by when casting hollow vanes.

Another technical advantage of the disclosed hollow vane assembly includes direct machining access within the internal passageways of the vane.

Another technical advantage of the disclosed hollow vane assembly includes capacity to optimize the geometry for strength/weight.

Another technical advantage of the disclosed hollow vane assembly includes capacity to alter the exterior structure of the cover.

Another technical advantage of the disclosed hollow vane assembly includes capacity to modify the modal response of the airfoil by use of surface features.

Another technical advantage of the disclosed hollow vane assembly includes the capacity to modify the structural behavior of the airfoil at different operating points of the engine.

Another technical advantage of the disclosed hollow vane assembly includes the capacity to optimize the airfoil structure for stresses at different engine operating points.

Another technical advantage of the disclosed hollow vane assembly includes the capacity to alter the stiffness of the airfoil.

Another technical advantage of the disclosed hollow vane assembly includes the optimization of the airfoil by use of the surface features for predetermined modal shapes and stresses at different engine operating points.

Another technical advantage of the disclosed hollow vane assembly includes tailoring the airfoils of the engine for different uses.

Another technical advantage of the disclosed hollow vane assembly includes tailoring the airfoils of the engine for different air-frame applications.

There has been provided a hollow vane assembly. While the hollow vane assembly has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process of tailoring vibratory characteristics of a cover for an open body hollow vane assembly comprising:
forming the open body, the open body including an interior;
forming a cover, the cover being configured to attach to the open body to form at least one flow passage;
forming at least one surface feature on an interior surface of the cover prior to brazing the cover to the open body, the surface feature configured to be proximate the interior; and
brazing the cover to the open body.

2. The process according to claim 1, further comprising:
forming the at least one surface feature integral with the interior surface of the cover independently of the open body.

3. The process according to claim 2, wherein the at least one surface feature is selected from the group consisting of a groove, a rib, a channel, a trench, a furrow, a dimple, a nub, a post, and an iso-grid.

4. The process according to claim 1, further comprising:
forming an airfoil from the combination of the open body brazed together with the cover.

5. The process according to claim 1, further comprising:
forming a single walled structure having contoured surfaces including the at least one surface feature formed by additive and/or subtractive processes.

6. The process according to claim 1, further comprising:
modifying a vibratory characteristic of the cover with the at least one surface feature.

7. The process according to claim 1, further comprising:
changing a modal shape of the cover with the surface feature to enhance the stiffness of the cover locally responsive to aerodynamic forces created by a working fluid flowing over the hollow vane assembly.

8. A process for modifying a vibratory characteristic of a cover to an open body comprising:
forming an open body, the open body includes a leading edge opposite a trailing edge, the open body includes a pressure side and suction side opposite the pressure side, the open body including an interior;
forming a cover, the cover being configured to couple with the open body proximate the pressure side to form at least one flow passage;
forming at least one surface feature on an interior surface of the cover prior to attaching the cover to the open body; and
brazing the cover to the open body.

9. The process of claim 8, further comprising:
modifying a vibratory characteristic of the cover with the at least one surface feature.

10. The process of claim 8, further comprising: changing a modal shape of the cover to enhance the stiffness of the cover locally responsive to aerodynamic forces created by a working fluid flowing over the hollow vane assembly.

11. The process of claim 8, further comprising: forming a single walled structure having contoured surfaces including the at least one surface feature formed by additive and/or subtractive processes.

12. The process of claim 8, further comprising: forming an airfoil from the combination of the open body brazed together with the cover having the at least one surface feature, the airfoil being responsive to the at least one surface feature.

13. The process of claim 8, further comprising: forming the surface feature by removing material from the interior surface of the cover.

* * * * *